Dec. 3, 1929.  H. JACOT  1,737,797
SANITARY FEED TROUGH
Filed Dec. 16, 1926
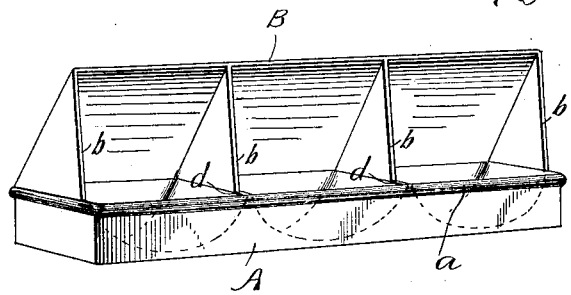
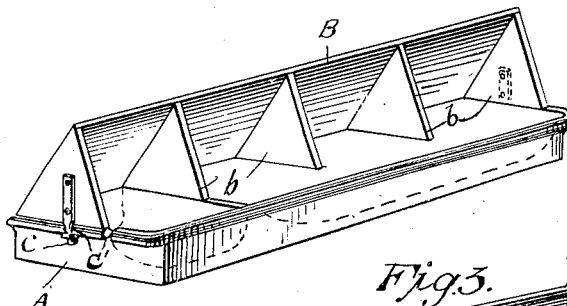
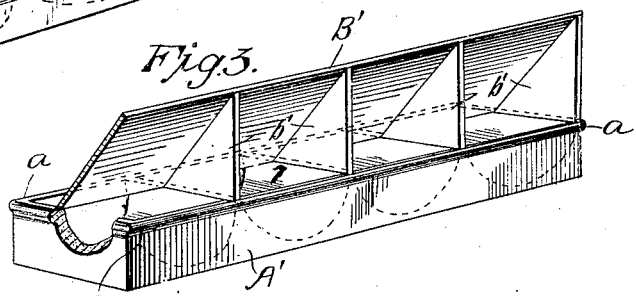
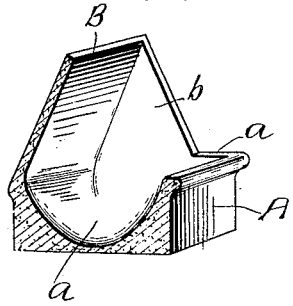
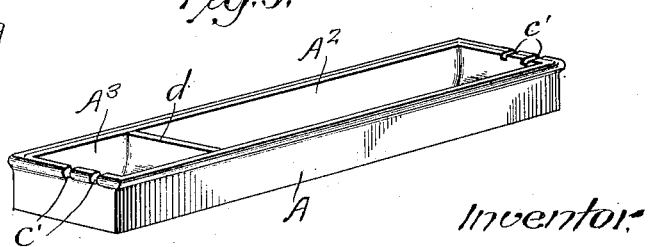
Inventor:
Henry Jacot
By Hiram Swartz, Atty.

Patented Dec. 3, 1929

1,737,797

UNITED STATES PATENT OFFICE

HENRY JACOT, OF APPLE CREEK, OHIO

SANITARY FEED TROUGH

Application filed December 16, 1926. Serial No. 155,330.

My invention relates to improvements in feed-troughs, and its principal objects are; first, to provide a sanitary trough for feeding hogs and the like; secondly, to provide a trough for such purpose which may be inexpensively constructed, and which will afford means for preventing the feed in the trough from being made foul and unsanitary by deposits of filth therein by animals while feeding thereat; thirdly, to provide improved means for preventing the animals while feeding from displacing each other, and from putting their feet in the trough, and from rooting the feed out of the trough onto the ground; and lastly, means for promoting cleanliness of the food and trough by its novel construction, and for preventing filth from accumulating or remaining therein, and to provide means for a proper diet of rations suited to separate needs and individual feeding.

It consists broadly in the construction of a feed trough made preferably of concrete substance or the like with smooth or polished surface and concave walls within, and a hood mounted longitudinally thereon, and projecting forwardly thereover so as to prevent the animals while feeding from stepping into the trough, and from throwing out the foods deposited therein. It further consists of providing a plurality of partitioned spaces in the trough and hood for separate feeding, and also in so locating the hood over the trough as to provide an open space back of the hood for depositing food in the trough and for changing access thereto, and for separating the hood from the trough for cleansing all as hereafter detailed and as stated in the appended claims.

My invention is illustrated by the accompanying drawing in which similar letters and figures of reference indicate like parts. Referring thereto, Fig. 1 is a front view of a sanitary hog-trough embodying my invention; Fig. 2 is a detail view of the hood secured in rear position on the trough; Fig. 3 is a perspective view showing the hood located forwardly over the trough leaving an open space behind the hood for introduction of food; Fig. 4 is a detail section showing the interior of the trough with hood in position thereon, and Fig. 5 is a detail view of the trough apart from the hood, and with a single partition therein. Figs. 1 and 4 show one form with the hood integral with the trough; and Figs. 2 and 3 show another form with the hood removable from the trough. In Fig. 1 the trough has two partitions, and in Fig. 3, three partitions; and in Fig. 2, the trough has only one partition, identical with Fig. 5; and the hood is provided with three partitions, two of which permit access to a common trough, as shown by dotted lines.

The hood partitions are indicated by the reference letters $b$ and $b'$, and the trough partitions by the reference letter $d$ in the several figures.

In the drawings A is the trough member, and B the hood member of my sanitary trough, $b$, $b$, are partitions in the hood, which are adapted to register with partitions, $d$, if any in the trough.

The hood B is adapted to rest longitudinally on the margins $a$, $a$, of the trough, and may be removably secured thereto, as in Figs. 2 and 3. In the latter case the hood may be detachably secured to the trough by means of the threaded bolts $c$, $c$, in engagement with the notches $c'$.

A pair of notches may be provided, as shown in Figs. 3 and 5, by which means the hood may be located either in line with the rear edge of the trough as in Fig. 2, or forwardly, as in Fig. 3, so as to leave the open feeding space aforesaid. The partitions and interior of the ends of the trough are preferably made concave in surface, so as to promote cleanliness, and prevent accumulation of filth in corners. By removal of the hood from the trough, better access may be had to the latter, and the several members may be more readily and effectually cleaned, and by shifting the position of the hood on the trough, accommodation is afforded for different kinds of food, and also for different animals, without additional expense or loss of sanitation. Partitions in the trough may be placed at intermediate points therein, or omitted entirely as may suit the kind of food and the animals served, and the hood and its partitions may be of wood or metal as may be preferred.

Having thus fully described my invention, what I claim and desire to secure by Letters Patent is:—

1. In a device of the character described, the combination with a feed trough, having concave ends and bottom, a hood extending over said trough transversely, and removably secured thereto, and means including a marginal flange on the trough and means connected therewith for detachably securing the hood thereon in a plurality of positions with reference to the front and rear sides of the trough to modify access thereto, substantially as set forth.

2. In a device of the character described, the combination with a feed trough, a hood extending over said trough transversely, and removably secured thereto, a marginal flange on said trough, a plurality of openings spaced apart therein a predetermined distance, and means, including bolts engaging said openings, respectively, adapted to secure the hood removably on said trough in either of two positions with reference to the front and rear sides of the trough, substantially as set forth.

In witness whereof, I hereunto set my hand this 5th day of October, A. D. 1926.

HENRY JACOT.